US008200010B1

(12) United States Patent
Jing et al.

(10) Patent No.: US 8,200,010 B1
(45) Date of Patent: Jun. 12, 2012

(54) IMAGE SEGMENTATION BY CLUSTERING WEB IMAGES

(75) Inventors: Yushi Jing, Mountain View, CA (US); Shumeet Baluja, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 986 days.

(21) Appl. No.: 11/858,368

(22) Filed: Sep. 20, 2007

(51) Int. Cl.
G06K 9/34 (2006.01)
(52) U.S. Cl. ........................... 382/173; 382/164
(58) Field of Classification Search .................. 382/164, 382/171, 173, 190
See application file for complete search history.

(56) References Cited

U.S. PATENT DOCUMENTS

| 6,601,759 | B2 | 8/2003 | Fife et al. | |
|---|---|---|---|---|
| 6,744,922 | B1* | 6/2004 | Walker | 382/190 |
| 6,766,037 | B1* | 7/2004 | Le et al. | 382/107 |
| 6,956,573 | B1* | 10/2005 | Bergen et al. | 345/473 |
| 7,095,786 | B1* | 8/2006 | Schonfeld et al. | 375/240.16 |
| 7,116,807 | B1 | 10/2006 | Brackett | |
| 7,827,191 | B2 | 11/2010 | Williams | |
| 2001/0038713 | A1* | 11/2001 | Kitagawa et al. | 382/209 |
| 2002/0059584 | A1 | 5/2002 | Ferman et al. | |
| 2003/0206710 | A1 | 11/2003 | Ferman et al. | |
| 2004/0103095 | A1* | 5/2004 | Matsugu et al. | 707/6 |
| 2004/0267458 | A1 | 12/2004 | Judson et al. | |
| 2005/0191731 | A1 | 9/2005 | Judson et al. | |
| 2005/0232485 | A1* | 10/2005 | Brown et al. | 382/173 |
| 2006/0221072 | A1* | 10/2006 | Se et al. | 345/420 |
| 2006/0249581 | A1* | 11/2006 | Smith | 235/454 |
| 2006/0269136 | A1* | 11/2006 | Squires et al. | 382/181 |
| 2006/0271398 | A1 | 11/2006 | Belcastro | |
| 2006/0285755 | A1* | 12/2006 | Hager et al. | 382/224 |
| 2007/0239603 | A1 | 10/2007 | Lasater et al. | |
| 2008/0027841 | A1 | 1/2008 | Eder | |
| 2009/0169168 | A1* | 7/2009 | Ishikawa | 386/52 |

OTHER PUBLICATIONS

Su et al. ("Face recognition by feature orientation and feature geometry matching", IEEE Proc. 13th ICPR, vol. 3, Aug. 25-29, 1996, pp. 401-405).*
Lowe ("Distinctive image features from scale-invariant keypoints", (accepted for publication in the International Journal of Computer Vision, 2004), 2004, pp. 1-23.*
Dalal, N. et al., "Histograms of Oriented Gradients for Human Detection," Proceedings of the 2005 IEEE Computer Society Conference Computer Vision and Pattern Recognition, (CVPR'05) Jun. 20-25, 2005, IEEE, [online], Retrieved from the Internet: <URL: http://www.vis.uky.edu/~dnister/Teaching/CS684Fall2005/HOG.pdf>.
Dementhon, D. et al., "Image Distance using Hidden Markov Models," 15$^{th}$ International conference Pattern Recognition (ICPR'00), 2000,vol. 2, p. 1347, Barcelona, Spain. [online], Retrieved from the Internet<URL:http://citeseer.ist.psu.edu/cache/papers/cs/22592/http:zSzzSzwww.cfar.umd.eduzSz~danielzS zdaniel_papersfordownloadzSz1169_dementhon.pdf/dementhon00image.pdf>.

(Continued)

*Primary Examiner* — Yubin Hung
(74) *Attorney, Agent, or Firm* — Fenwick & West LLP

(57) ABSTRACT

An image segmentation system selects candidate images from an image collection. Image analysis on individual images proceeds by first detecting salient features on each image. Patches are centered on points of interest located on the salient features of the image. Each patch is gridded into blocks. The block feature vectors are merged to generate a patch feature vector. A fingerprint for each image is obtained by merging patch feature vectors across the image. Images with similar fingerprints are identified and geometric matching is performed to further select images with similar objects. Common regions are tabulated and merged into single regions to segment out coherent objects.

25 Claims, 11 Drawing Sheets

OTHER PUBLICATIONS

Ke, Y. et al., "PCA-SIFT: A More Distinctive Representation for Local Image Descriptors," Proceedings of Computer Vision and Pattern Recognition, 2004, [online], Retrieved from the Internet:: <URL:http://www.cs.cmu.edu/~rahuls/pub/cvpr2004-keypoint-rahuls.pdf>.

Liu, T. et al., "An Investigation of Practical Approximate Nearest Neighbor Algorithms." [online], Retrieved from the Internet: Proc. Neural Info Processing Systems 2004 <URL: http://www.cs.cmu.edu/~tingliu/my_papers/nips04.pdf>.

Liu, Z. et al., "Face Detection and Tracking in Video Using Dynamic Programming," ICIP-2000, Vancouver, Canada. [online], Retrieved from the Internet<URL:http://citeseer.ist.psu.edu/liu00face.html>.

Lowe, D., "Distinctive Image Features from Scale-Invariant Keypoints," International Journal of Computer Vision, 2004, pp. 91-110, vol. 60, No. 2 [online], Retrieved from the Internet <URL: http://www.cs.ubc.ca/~lowe/papers/ijcv04.pdf>.

Mikolajczyk, K. et al., "A Performance Evaluation of Local Descriptors," IEEE Transactions on Pattern Analysis and Machine Intelligence, Oct. 2005, vol. 27, No. 10, pp. 1615-1630 [online], Retrieved from the Internet <URL: http://doi.ieeecomputersociety.org/10.1109/TPAMI.2005.188>.

Mortensen, E. et al, "A SIFT Descriptor with Global Context," 2005 IEEE Computer Society Conference on Computer Vision and Pattern Recognition (CVPR'05), vol. 1, pp. 184-190, [online], Retrieved from the Internet<URL: http://doi.ieeecomputersociety.org/10.1109/CVPR.2005.45>.

Nister, D. et al., "Scalable Recognition with a Vocabulary Tree," 2006 Proceedings of IEEE Computer Society Conference on Computer Vision and Pattern Recognition—vol. 2 (CVPR'06), Jun. 2006, pp. 2161-2168, [online], Retrieved from the Internet <URL:http://doi.ieeecomputersociety.org/10.1109/CVPR.2006.264>.

Stauffer, C. et al., "Adaptive Background Mixture Models for Real-Time Tracking," IEEE Computer Society Conference on Computer Vision and Pattern Recognition, Jun. 1999, pp. 246-252. [online], Retrieved from the Internet: <URL:http://www.cs.rit.edu/~rsg/Tracking%20StaufferGrimson.pdf>.

\* cited by examiner

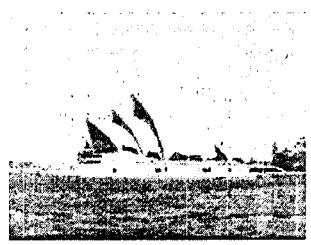
FIG. 11A
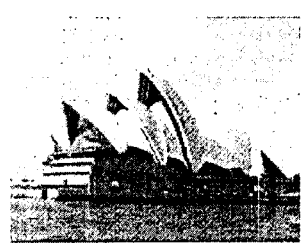
FIG. 11B
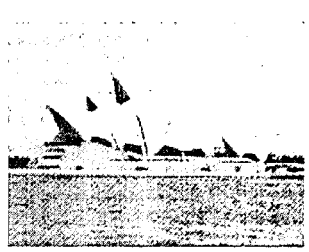
FIG. 11C
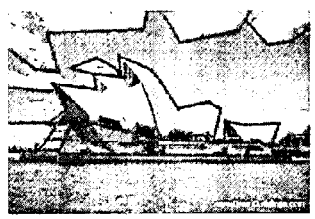
FIG. 11D
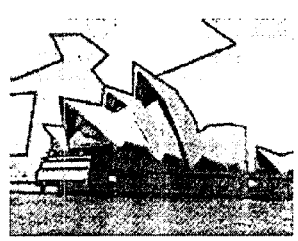
FIG. 11E
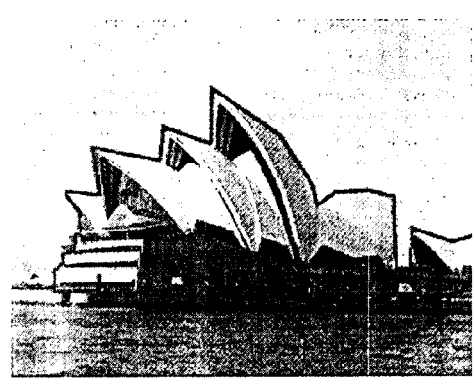
FIG. 11F
FIG. 11

IMAGE SEGMENTATION BY CLUSTERING WEB IMAGES

BACKGROUND

1. Field of the Invention

The present invention pertains in general to image segmentation systems and in particular to techniques for segmenting individual images by combining information from individual images and groups of images.

2. Background of the Invention

Image segmentation refers to the process of partitioning an image into multiple regions. This is done to make the image easier to analyze. Typically, image segmentation is used to locate objects and boundaries within images. Objects or regions in the image are identified based some characteristic or property such as color, intensity, or texture. Adjacent regions are typically significantly different with respect to the same characteristic.

Traditionally, image segmentation examines individual images to find regions of a particular color, a smooth color variation, or based on a priori knowledge of what is being segmented. The drawbacks of such a process clearly stem from the fact that such a priori knowledge of a model, color, or texture is not always readily available. For objects or regions that are novel or yet to be characterized, this process clearly falls short.

Further, by segmenting a single image at a time, common objects in different images may be classified differently due to color, lighting, and texture variations between images. Further, color variations within an object in an image may cause the segmentation to only identify a sub-region and not the complete region.

SUMMARY OF INVENTION

A method and a system segments individual images by combining information from multiples images and groups of images. To segment images in an image collection, a set of images are analyzed to derive a fingerprint of each image. Each fingerprint comprises an aggregation of sub-fingerprints derived from distinctive features in the image. The fingerprints for the images are compared so as to select similar images having regions that are common among some portion of the set of images. The images are then segmented based upon the common regions. Image segmentation is thus done in a semantically-coherent way, the semantics coming from evaluating a large set of image similarities.

A system for segmenting images from an image collection includes a feature detection module that detects features at various locations in a set of images. The features are detected based on attributes in the images. A patch generation module generates patches within each detected feature, with each patch comprising an area of a fixed geometrical shape. An image fingerprint generation module derives a fingerprint for each the images by merging patch feature vectors from various patches. A similar image identification module compares fingerprints from the images to select similar images with common regions. A geometric matching module matches geometric characteristics between matching pairs of patches, using pairwise selections of images to identify common regions. Finally, a common object generation module merges the identified common regions into a single region.

The present invention has further embodiments in computer system and software architectures, computer program products and computer implemented methods, and computer generated user interfaces and search result contents.

The foregoing are just some of the features of an image segmentation system and methodology based on images. Those of skill in the art of information retrieval will appreciate the flexibility of generality of the image segmentation allows for a large variety of uses and applications in linking objects in images within personal image collections or larger collections, searching for and retrieving similar objects in images or video, virtual linking of images, and identifying product placements in images.

BRIEF DESCRIPTION OF THE DRAWINGS

FIGS. 11A-F illustrate the stages of image segmentation on a sample set of images depicting the Sydney Opera House.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. System Overview

Figure 1:
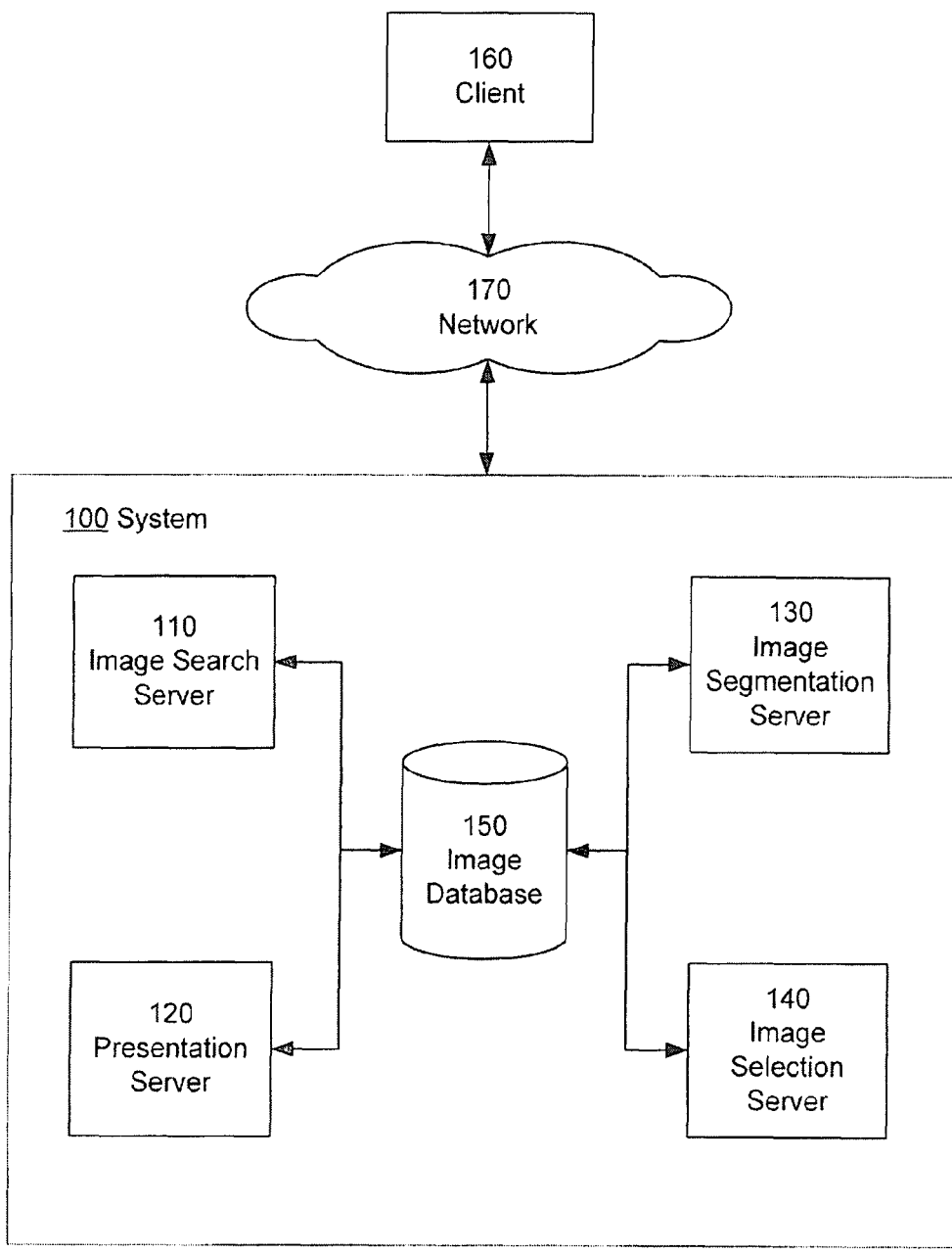
FIG. 1 is a block diagram of an image segmentation system in accordance with one embodiment of the present invention.

FIG. 1 is a block diagram of an image segmentation system 100 for a large scale image collection in accordance with one embodiment of the present invention. The image segmentation system 100 communicates with a client 160 over a network 170. The image segmentation system 100 includes an image search server 110, a presentation server 120, an image segmentation server 130, and an image selection server 140, all coupled to an image database 150. These elements are used by the image segmentation system 100 to provide various aspects of image segmentation services to the client 160. Only a single client 160 is shown, but in practice the system 100 would communicate with large numbers of clients 160 concurrently. The client 160 can be any type of computing device including a browser (for example to allow individual users to submit queries), or it can be any application program with programmatic access to an application programming interface exposed by the image segmentation system 100. Additionally, image segmentation system 100 can also expose an application programming interface that allows other applications to directly input properly formed queries. Each of the various servers is implemented as server program executing on server-class computer comprising a CPU, memory, network interface, peripheral interfaces, and other well known components. The computers themselves preferably run an open-source operating system such as LINUX, have generally high performance CPUs, 1G or more of memory, and 100G or more of disk storage. Of course, other types of computers can be used, and it is expected that as more powerful computers are developed in the future, they can be configured in accordance with the teachings here. The functionality effected by any of the elements can be provided from computer program products that are stored in tangible computer accessible storage mediums (e.g., RAM, hard disk, or optical/magnetic media).

The image search server 110 receives a query from a client 160 over the network 170 and, in response to the client query searches and retrieves a corresponding set of images from the image database 150. The image selection server 140 can also retrieve a set of images from the image database 150 (e.g., based on a list of metadata), without a search request from the client 160 and a corresponding response from the image search server 110. The retrieved collection of images is presented to the image segmentation server 130. The image segmentation server 130 receives as input a collection of images and provides as output a set of segmented images. The presentation server 120 then presents the segmented images to the client 160.

II. Image Analysis

Figure 2:
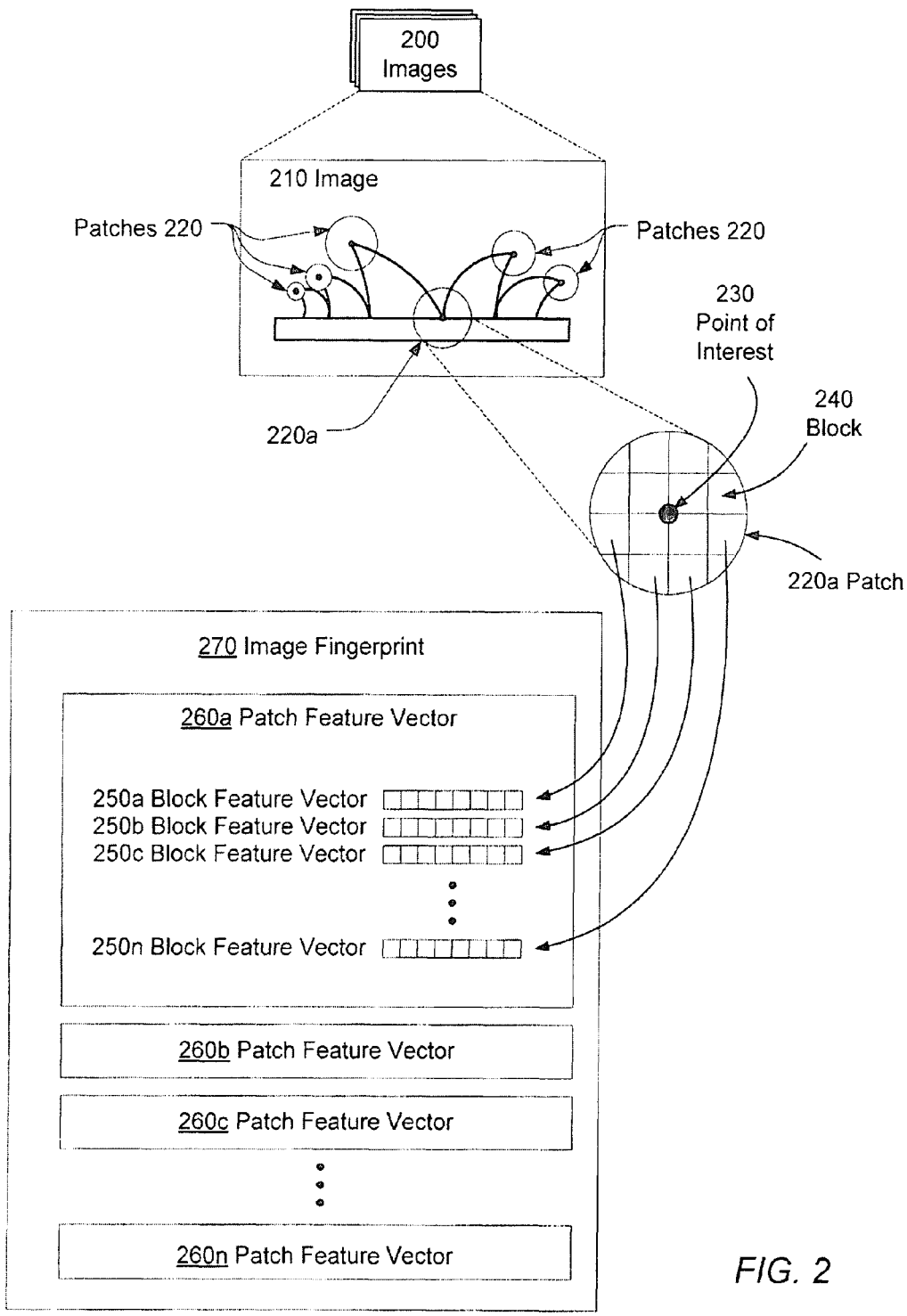
FIG. 2 is an illustration of the steps involved in generating an image fingerprint from an image in accordance with one embodiment of the present invention.

FIG. 2 is an illustration of the steps involved in image analysis, i.e., generating an image fingerprint from an image, in accordance with one embodiment of the present invention. Images 200 represent the images retrieved either by the image search server 110 in response to a search by client 160 or by the image selection server 140, or by any other selection means, and that are ready for segmentation. Image 210 is one image among the collection of images 200. A similar analysis as described in the following paragraphs is performed on each of the other images 200 in the collection.

1. Feature

Features are identified at various locations on the image. A feature is any programmatically distinguishable characteristic associated with a point on the image that is considered significant based on determining any number of characteristics associated with that point, such as edge, color, intensity, texture, wavelet transforms, corner, or orientation histogram. From among these features at various points or locations of the image, points of interest are determined by identifying those points with a high variation of current features from the surrounding features, i.e., discontinuities in feature characteristics. Points of interest may be detected computationally as discontinuities or differences from surrounding points using any known method such as the Harris or Difference of Gaussian (DoG) method. However, other methods may be used for detecting points of interest. FIG. 2 shows several such points of interest and one such point of interest 230 is highlighted. A collection of matching local features defines an object on an image. An image may contain many such objects.

2. Patch

A patch is a defined region around a point of interest and that contains a salient feature on the image. Patch 220a is a patch defined around the point of interest 230. Image 210 shows several patches 220 defined at varying scales at each point of interest on the image. Patches may have any shape associated with them, i.e., circular, rectangular, etc. FIG. 2 illustrates the use of circular patches, as will be used throughout the various embodiments described herein. Circular patches are defined by a radius and a pixel offset of the center of the circle from a corner of the image represented in a suitable coordinate system for the image. In addition, patches may also have an orientation associated with them, the orientation being an angle relative to an initial axis (e.g., horizontal or vertical axis). Patch orientation is defined by identification of an intensity gradient with the patch. Each patch from among the set of patches 220 defined around the salient features of the image is defined in this manner. Patches may be generated using any known method such as scale-invariant feature transform. Collectively, the patches define the salient features of an image. Hence, an object on the image may be represented by the locus of patches corresponding to salient features of the object.

3. Block

Each patch is gridded into a number of blocks. As an example, FIG. 2 shows patch 220a having grid of 16 blocks, such as block 240. A block is a sub-section of a patch that helps to quantize patch characteristics such as orientation. Patches may be gridded into blocks using any known method such as those that generate log-polar grids or logarithmic spiral grids.

4. Feature Vector

An object on an image may be represented by a multi-dimensional vector of numerical features. Such numerical representations of objects facilitate processing and statistical analyses. The numerical values corresponding to features vary with the feature, e.g., for images the feature values may be pixels of the image, for color distributions on an image the feature values may correspond to the Red-Green-Blue (RGB) colorspace or the YIQ colorspace, etc. Such vectors are referred to as feature vectors. The dimensionality of the feature vector may be adjusted through various techniques such as by choosing a bin size for the feature values thereby determining the number of bins that define the feature vector. FIG. 2 shows 8-bin block feature vectors 250a, 250b, 250c, through 250n corresponding to each of the n blocks in patch 220a. For example, if patch 220a is gridded into sixteen blocks 240 and each block 240 has an 8-bin block feature vector 250a, 250b, 250c, etc. then the entire patch 220a has feature values in 128 bins (16 blocks×8 bins per block). In one embodiment, the 8-bin block feature vectors for each of the 16 blocks are stacked or merged to arrive at a 128-bin patch feature vector. FIG. 2 illustrates the generation of patch feature vector 260a from the constituent block feature vectors 250a, 250b, etc. from each block within patch 220a. The bin size and number of bins may be varied to alter the dimensionality of the feature vectors to adequately represent the feature being detected. Similarly, other patch feature vectors 260b, 260c, through 260n are derived from other features represented by other patches 220.

5. Fingerprint

An image fingerprint is obtained by stacking or merging (e.g., concatenating) patch feature vectors representing all the salient features of an image. FIG. 2 illustrates the generation of image fingerprint 270 by stacking or merging patch feature vectors 260a, 260b, 260c, through 260n. In one embodiment, each patch contains a sub-fingerprint or a portion of the image fingerprint.

III. Overview of Image Segmentation

Figure 3:
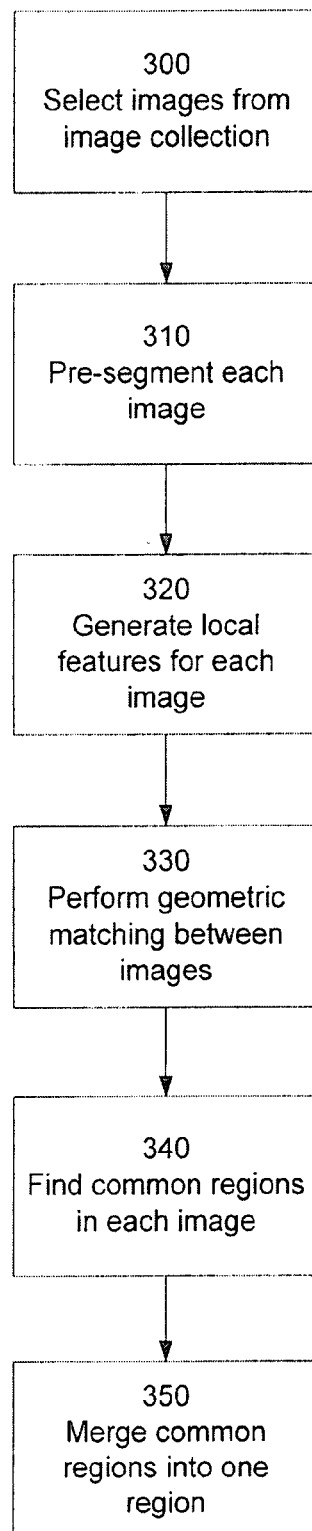
FIG. 3 is a high-level flow diagram illustrating the steps involved in image segmentation from a collection of images in accordance with one embodiment of the present invention.

FIG. 3 is a high-level flow diagram illustrating the steps involved in image segmentation from a collection of images in accordance with one embodiment of the present invention. The candidate images that will be subjected to image segmentation are selected 300 from an image collection. Examples of three different images labeled "Sydney Opera House" are shown in FIG. 11A, FIG. 11B, and FIG. 11C. These images may represent a set of images selected from an image collection. Each selected image is pre-segmented 310 using commonly used methods such as those based on color, texture, etc. FIG. 11D and FIG. 11E show pre-segmented images of the Sydney Opera House, wherein initial boundaries are drawn based on similar color information. Alternately, smoothing or geometric constraints may be enforced on the pre-segmented regions. The next step involves generating 320 local features at various points of interest on each image. Any number of features may be computed. Given a set of features from image A and a set of features from image B, the next step is to find the correspondence between those features by geometric matching 330 or verification. Given a collection of correctly matched points of interest, together with the initial boundaries using traditional image segmentation techniques, a collection of common regions may be found 340 in each image. The common regions are tabulated and merged 350 into a single region representing a coherent object, such as that of the Sydney Opera House in FIG. 11F. These and other steps are discussed in greater detail in the following sections.

IV. Details of Image Segmentation

Figure 4:
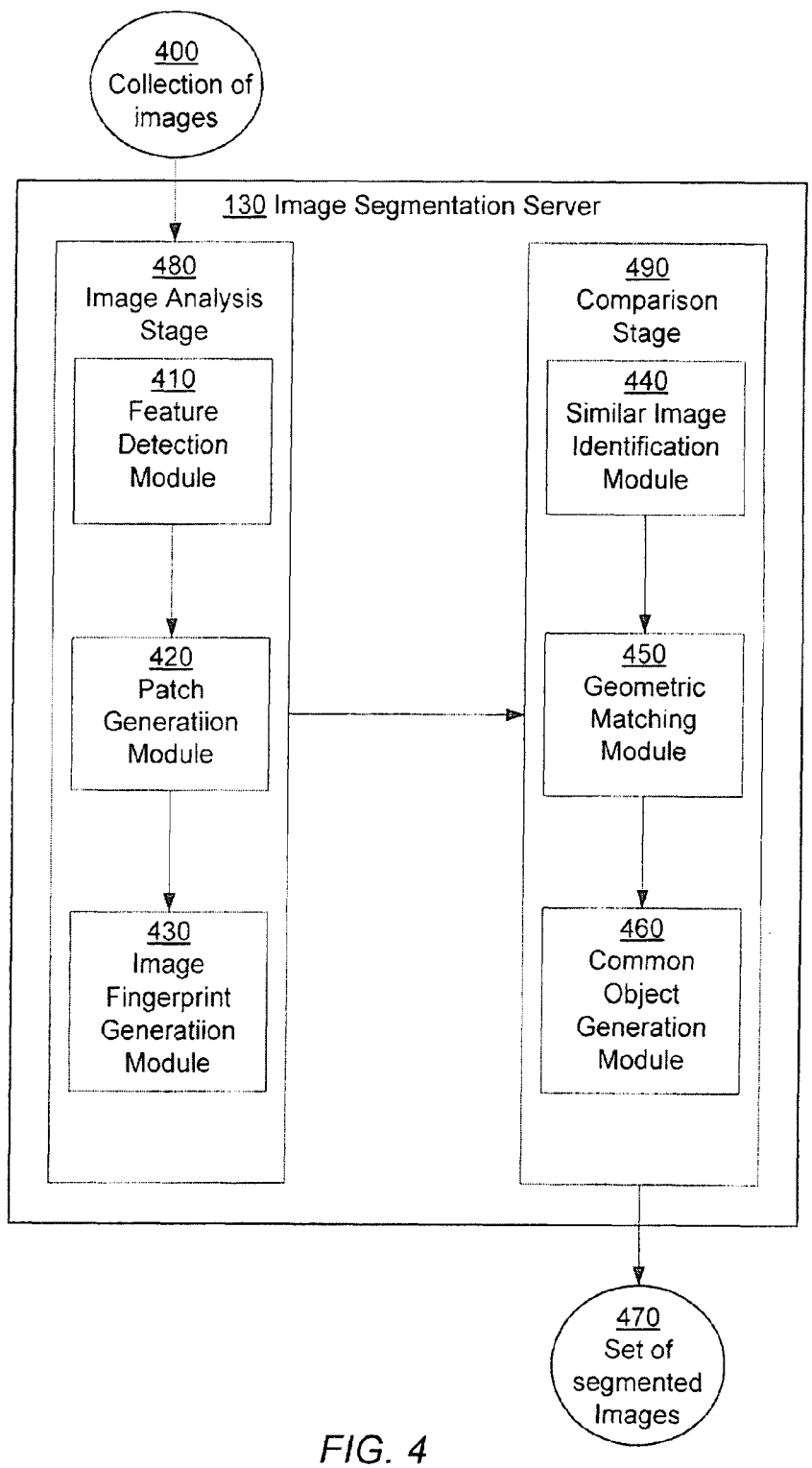
FIG. 4 is a high-level block diagram of one embodiment of an image segmentation server.

FIG. 4 is a high-level block diagram of one embodiment of an image segmentation server 130. The image segmentation server 130 takes a collection of images 400 and proceeds to generate a set of segmented images 470 such that common objects in images within the image collection 400 are clearly identified. In one embodiment, image segmentation proceeds by first obtaining image information on individual images, comparing the information across a collection of images, refining the information based on the comparison, and using the refined information to segment individual images. The tasks of the image segmentation server 130 may be logically separated into two separate stages:

480: Image Analysis Stage; and
490: Comparison Stage.

Each of these stages will now be discussed in further detail.

1. Image Analysis Stage

The Image Analysis Stage 490 comprises the following three modules:

410: Feature Detection Module;
420: Patch Generation Module; and
430: Image Fingerprint Generation Module.

Each of these modules will now be discussed in greater detail.

(1) Feature Detection Module

Figure 5:
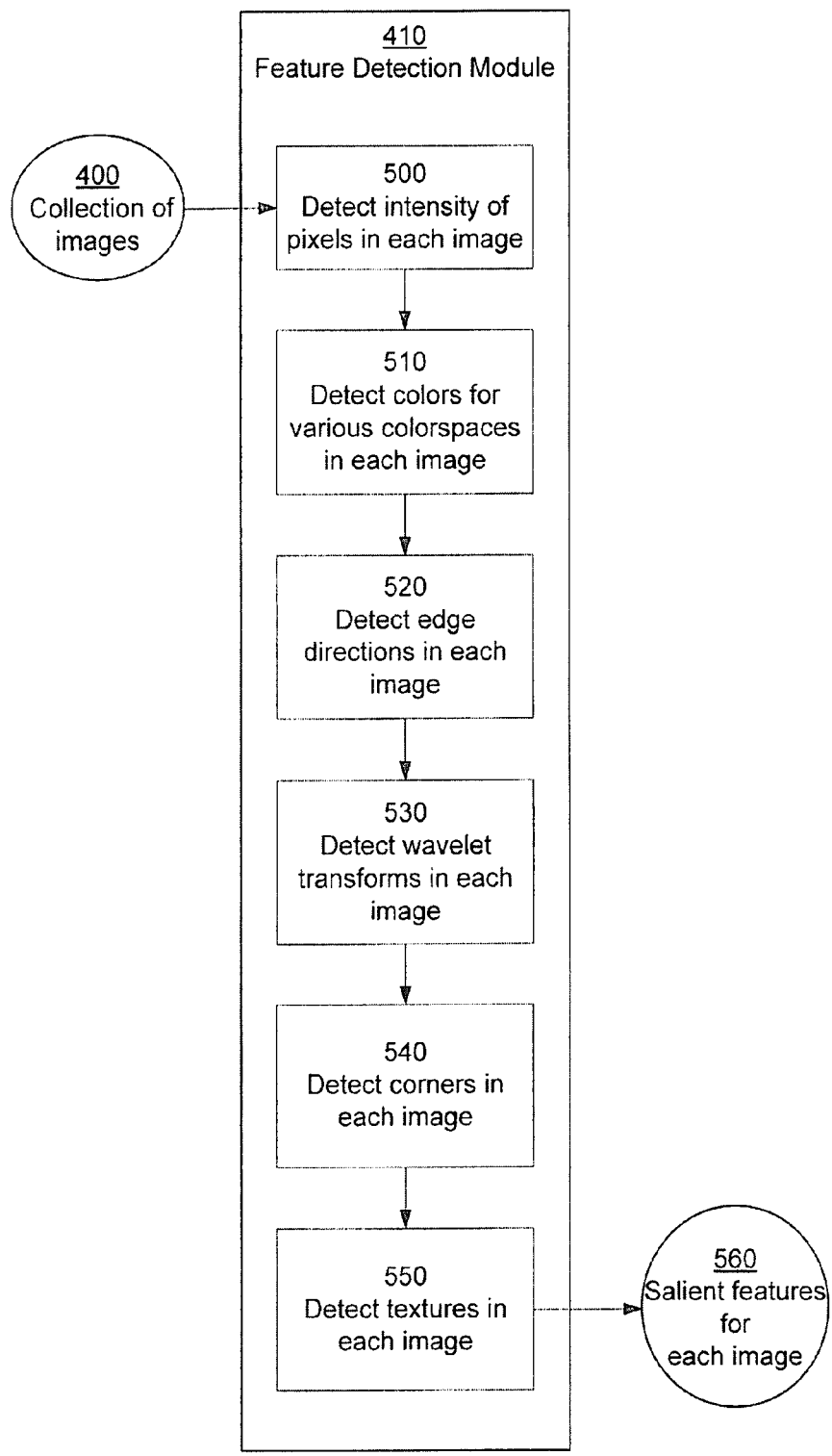
FIG. 5 is a flow diagram of one embodiment of a feature detection module within the image segmentation server.

FIG. 5 is a flow diagram of one embodiment of a feature detection module 410 within the image segmentation server 130. The feature detection module 410 takes as input a collection 400 of one or more images and returns salient features 560 for each image. The present invention is not limited to any particular feature or types of features used; the features need only have the characteristic of being derived from the pixel data of the image. This may involve detecting the intensity of pixels 500, detecting colors for various colorspaces 510 such as RGB and YIQ, detecting edge directions 520, detecting wavelet transforms 530, detecting corners 540, and detecting textures 550. A variety of other features may be computed, some edge-based, some color-based, some intensity-based, and some texture-based. Features may include those based on wavelets or corner features. Any number of alternate features including color histograms and shape context may be used.

(2) Patch Generation Module

Figure 6:
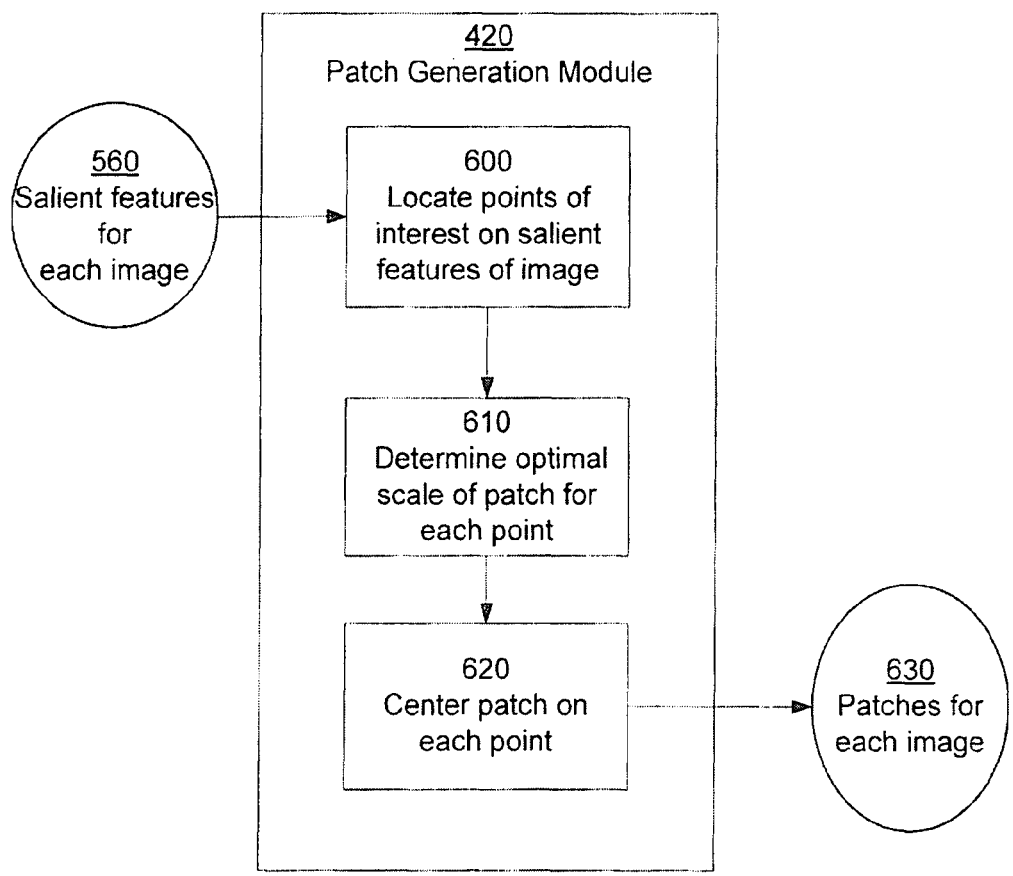
FIG. 6 is a flow diagram of one embodiment of a patch generation module within the image segmentation server.

FIG. 6 is a flow diagram of one embodiment of a patch generation module 420 within the image segmentation server 130. The patch generation module 420 takes in the salient features 560 for each image and returns a collection of patches 630 for each image. The patch generation module 420 first locates 600 the points of interest within the salient features of an image using any known method such as the Laplacian of Gaussian (LoG) method. Candidate points of interest may be found by any known method such as comparing neighboring pixels. Detailed models are next fitted on data for scale, location, and curvature obtained from the proximity of the candidate points. Points of interest are selected by any known method such as one based on their measures of stability, such as contrast and localization along edges. However, any other selection method for points of interest is equally applicable. The patch generation module 420 then determines 610 an optimal scale for each patch centered on each point of interest. In one embodiment, several scales or sizes are analyzed for each patch around a point of interest corresponding to a salient feature and the one scale that matches the underlying image patterns is selected. The relationship between the change in patch scale with respect to a stability measure is determined, and the scale corresponding to the maximum stability measure is chosen as the scale of the patch. When patch size is appropriate for the resulting block size then maximum stability is reached and as the patch size gets larger the stability drops. Accordingly, each patch has its own scale. Based on the determined scale, a patch of that scale is centered 620 on the point of interest. Each patch is defined by a location, a size, and an orientation. Orientation may be computed by any known method such as using the scale to select a Gaussian smoothed image with the closest scale that permits scale-invariant computations and computing the orientation based on the Gaussian smoothed image using pixel differences. However, any other orientation assignment is equally applicable. Although circular patches are considered throughout this disclosure, other shapes such as rectangular patches are equally applicable.

(3) Image Fingerprint Generation Module

Figure 7:
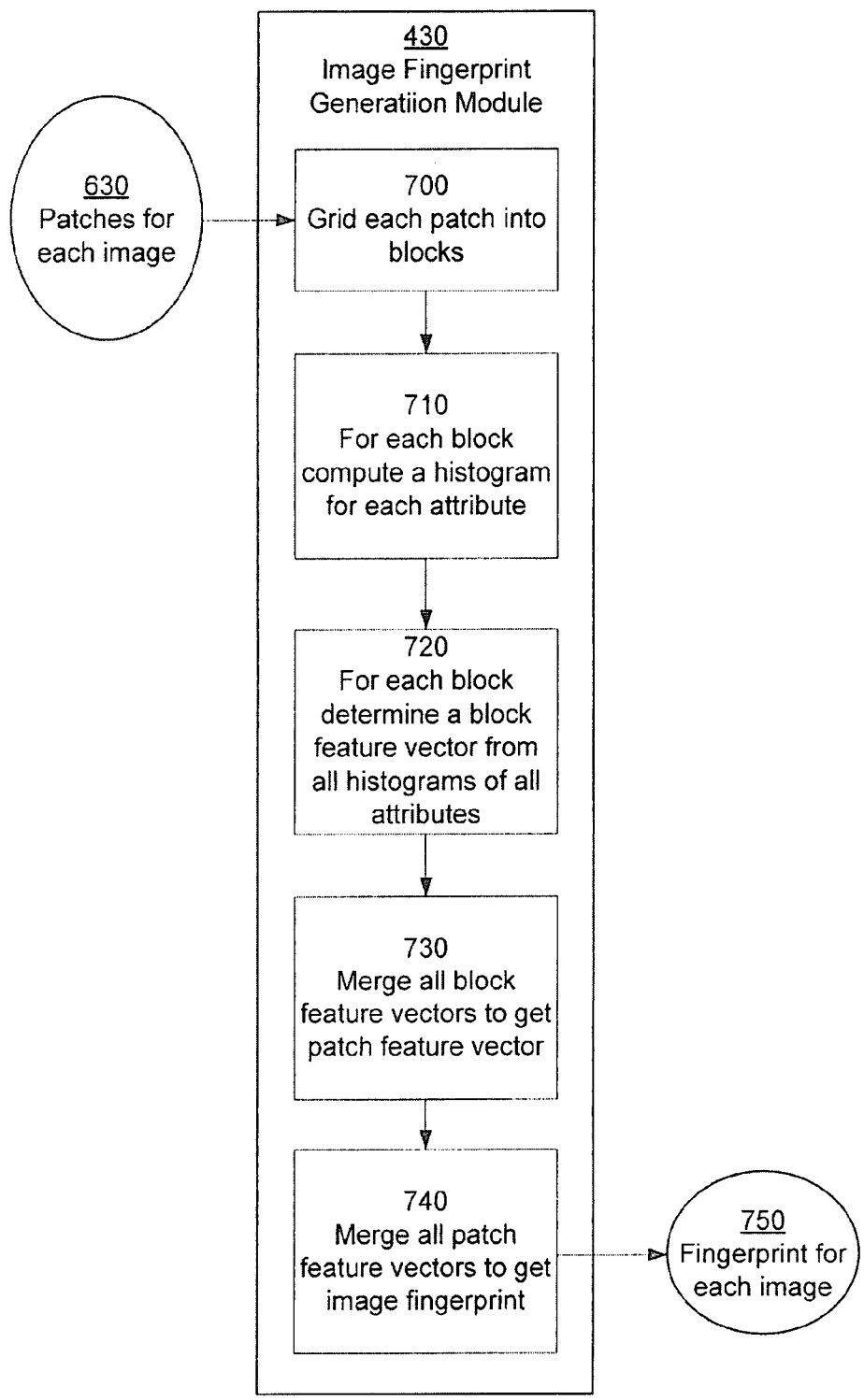
FIG. 7 is a flow diagram of an image fingerprint generation module within the image segmentation server.

FIG. 7 is a flow diagram of an image fingerprint generation module 430 within the image segmentation server 130. The fingerprint generation module 430 takes a collection of patches 630 for each image and returns a fingerprint 750 for each image. Each patch is gridded 700 into a number of blocks. In one embodiment, the number of blocks per patch is invariant. This implies that larger patches have larger blocks. A patch has various attributes associated with it including scale, location, and orientation. Other attributes may be applicable. For each block, and for each quantizable feature, a histogram for the feature is computed 710. A block feature vector is determined 720 by aggregating the histograms for each attribute of the block. All the block feature vectors corresponding to a patch are stacked or merged 730 to generate a patch feature vector. This procedure is repeated for each patch within the image and finally, all the patch feature vectors are stacked or merged 740 into a single feature vector considered as a fingerprint 750 for the image.

2. Comparison Stage

The Comparison Stage 490 comprises the following three modules:

440: Similar Image Identification Module;
450: Geometric Matching Module; and
460: Common Object Generation Module.

Each of these modules will now be discussed in greater detail.

(1) Similar Image Identification Module

Figure 8:
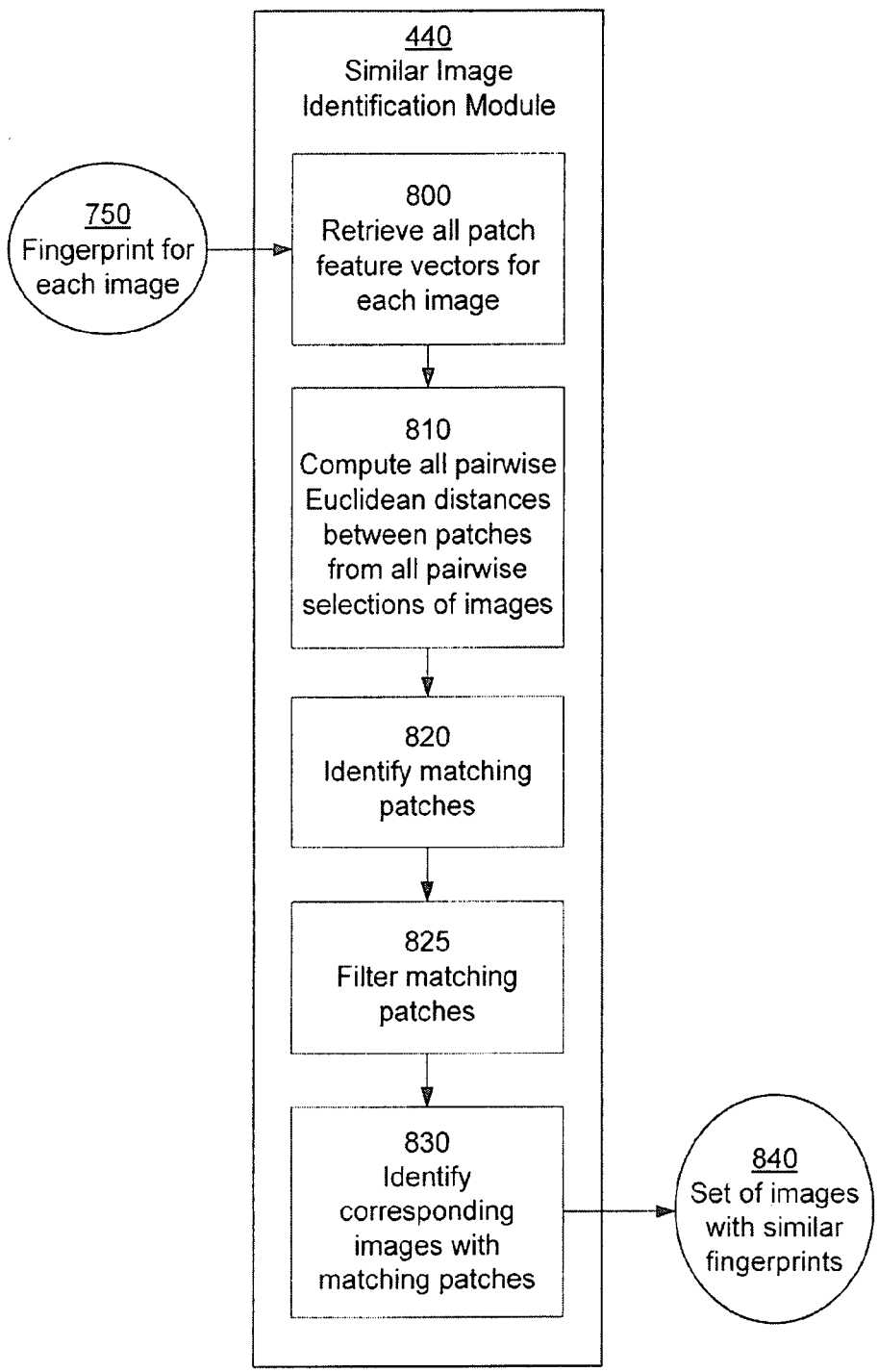
FIG. 8 is a flow diagram of a similar image identification module within the image segmentation server.

FIG. 8 is a flow diagram of a similar image identification module 440 within the image segmentation server 130. The similar image identification module 440 takes the fingerprint 750 for images in the collection 400 of images and returns a set of images 840 with similar fingerprints.

Assume images A and B in the collection of images are to be evaluated by the similar image identification module 440 to determine if they have similar fingerprints. The similar image identification module 440 retrieves 800 all patch feature vectors from the fingerprint 750 for each of images A and B. Each patch feature vector constitutes a portion of the image fingerprint 750.

The Euclidean distance D between patch A in image A and patch B in image B is computes as follows:

$$D(patchA, patchB) = D(v_1 \ldots v_n, u_1 \ldots u_n) = \sqrt{\sum_{i=1}^{n}(v_i - u_i)^2}$$

where, $v_1 \ldots v_n$=feature values $v_1, v_2$, through to $v_n$ corresponding to n-dimensional patch feature vector for patch A in image A, and $u_1 \ldots u_n$=feature values $u_1, u_2$, through to $u_n$ corresponding to n-dimensional patch feature vector for patch B in image B.

Of course, other distance functions can be used as well.

The dimensionality of a patch feature vector is determined by the number of blocks the patch is gridded into and further by the number of bins corresponding to each block feature vector, with each number determined empirically.

Based on all the patch feature vectors for images A and B, all pairwise distances between every patch in image A and every patch in image B are computed 810. If there are N patches in image A and M patches in image B then a total of N×M pairwise comparisons of distances are performed between patches in images A and B. In one embodiment, the images A and B are determined to be similar when a minimum number of these N×M patch-to-patch distances between images A and B are within a threshold distance of each other, as will be further explained below.

A simple threshold test is applied to identify 820 matching patches in images A and B as follows. For a particular patch in image A, the corresponding best two matches in image B are identified. If the distance between the patch in image A and the best matched patch in image B is significantly lower than the distance between patch in image A and the second best matched patch in image B then there is a distinguishable match between the patch in image A and the best matched patch in image B. Further, for the distinguishable match between the patch in image A and the best matched patch in image B, if the distance between the patches is within a threshold distance, then the two patches are identified 820 as matching patches.

The above process yields pairs of matching patches between any two images. Since each patch comes with a scale, orientation (or rotation), and location (or translation), a transformation between a pair of matching patches may be computed as changes in scale, orientation, and location between the pair of matching patches. For pairs of matching patches between any two images, if the transformation is not consistent across all pairs of matching patches then the subset of pairs of matching patches with inconsistent transformations are filtered out and eliminated. The bounds for consistency are derived in practice. For example, for orientation a maximum of 30% variance may be acceptable and for scale a maximum of 1.5-fold variance may be acceptable. Upon filtering 825 pairs of matching patches based on the transformation criteria, the best matching patches between images are retained.

For scale and orientation, the transformation between pairs of matching patches is computed in terms of differences in corresponding values for scale and orientation. However, for location, the transformation between pairs of matching patches may be computed as a function of scale and/or orientation as in the following example.

For a pair of matching patches, if a and c are scaling parameters respectively, b and d are location parameters respectively, and x is a transformation parameter and further, if the following relationship holds, $$ax+b=cx+d$$

then, $$b=(c-a)x+d$$

Thus the location parameter b may be expressed as a function of scaling parameters a and c besides the other location parameter d.

Once the best matching patches are identified between images, the corresponding images with the matching patches are identified 830. Upon examining all patches in the collection of images in this fashion, the similar image identification module 440 identifies a set of images with similar fingerprints as images that contain matching patches.

(2) Geometric Matching Module

Figure 9:
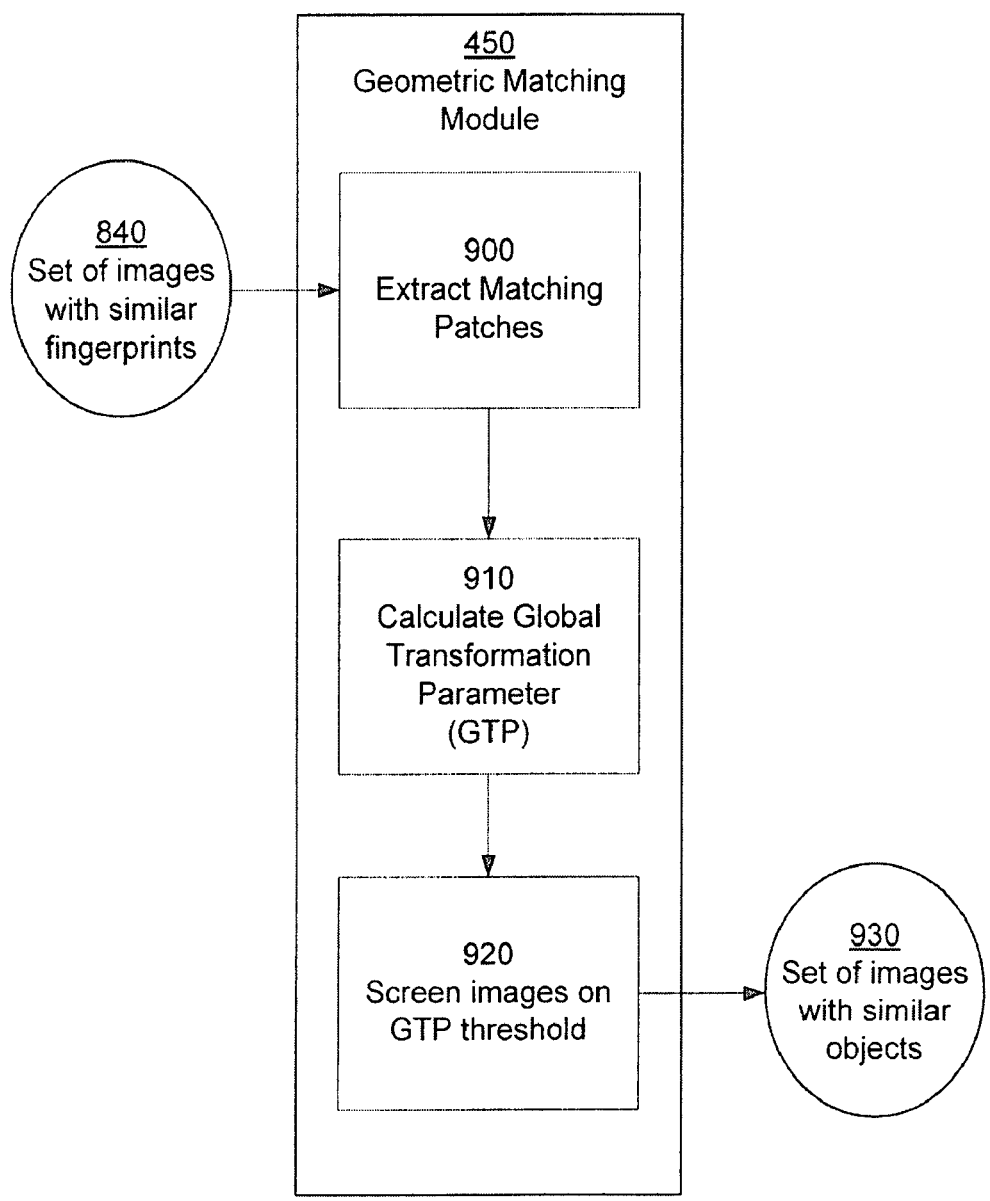
FIG. 9 is flow diagram of a geometric matching module within the image segmentation server.

FIG. 9 is flow diagram of a geometric matching module 450 within the image segmentation server 130. The geometric matching module 450 takes a set of images 840 with similar fingerprints and returns a set of images 930 with similar objects. FIG. 2 illustrates how the image fingerprint 270 is generated by stacking or merging block feature vectors 250a through 250n corresponding to each block within patch 220a. Let us assume that images A and B in the set of images 840 share a similar fingerprint. This implies that images A and B share at least one object in common whose fingerprints are similar. The patches that constitute the fingerprint in image A and the patches that constitute the fingerprint in image B are next extracted 900 as matching patches. Geometric verification examines groups of matching patches across two images. If patch A in image A matches patch B in image B and patch B is much smaller than patch A then it implies that the transformation is from a bigger to smaller object. If all patches in image A are larger than all patches in image B then it implies that the transformation is consistent.

To measure this transformation, a global transformation parameter (GTP) is calculated 910 as a metric between these two matching collections of patches as follows:

$$Ax=B$$

where,
A=locations of matching patches in image A,
B=locations of matching patches in image B, and
x=global transformation parameter.

The GTP metric is calculated using a least squares fit and the images are screened 920 based on a GTP threshold. The locations A and B may be represented in screen coordinates. In one embodiment, if the error of the least squares fit is too large, i.e., exceeds a threshold, then the match between the sets of patches in images A and B is rejected. In one embodiment, if the error of the least squares fit is too large, i.e., exceeds a threshold, then outliers in terms of patch locations are rejected and the GTP is estimated a second time, without the outliers. Hence the GTP metric is a final filter used to identify the set of images 930 with similar objects.

(3) Common Object Generation Module

Figure 10:
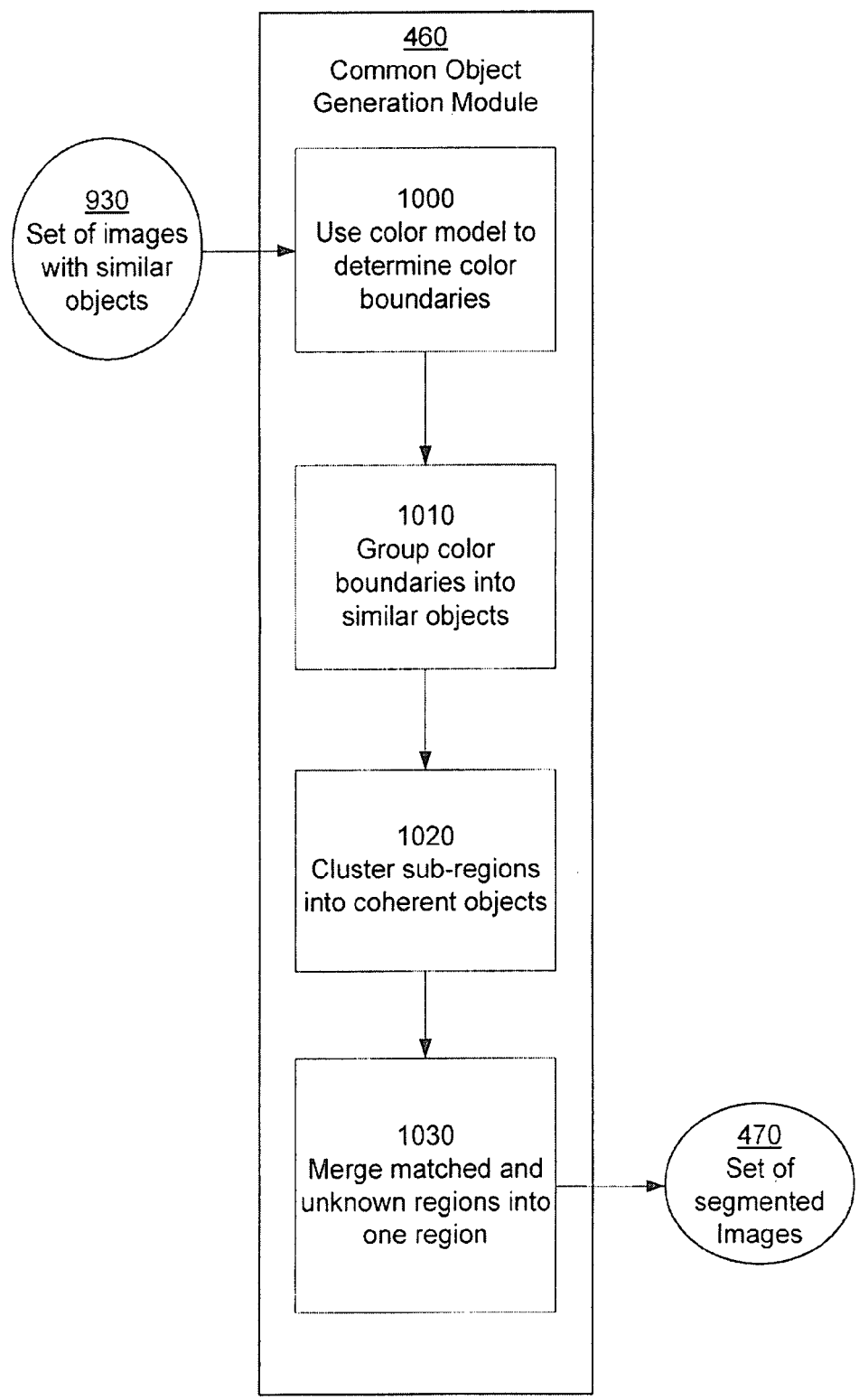
FIG. 10 is flow diagram of a common object generation module within the image segmentation server.

FIG. 10 is flow diagram of a common object generation module 460 within the image segmentation server 130. The common object generation module 460 takes a set of images 930 with similar objects and generates segmented images 470, i.e., images with common objects identified.

The matching patches extracted by the geometric matching module 450 in different images help define matching boundaries and further help group the matching boundaries into similar and distinguishable objects. The matching patches between any two images indicate a very high correlation between several points on the images. Given a collection of correctly matched points, together with initial boundaries using traditional image segmentation techniques, a collection of common regions are identified in the image. Further, a color model is used 1000 to define color boundaries. Segmentation in color is used to group 1010 the color boundaries into similar objects. In one embodiment, these objects are sub-regions or sub-clusters of a larger more coherent object. Information from the original matching patches and hence matching boundaries in the neighborhood of the sub-clusters is used to determine which of the sub-clusters or sub-regions need to be further clustered 1020 into one big cluster to form one coherent object.

The pseudo-code listed below depicts an embodiment of an algorithm that, (i) selects regions with greater than a threshold number of matched points of interest from among the images in an image collection, and (ii) merges sub-regions that are geometrically adjacent to each other (nearest neighbor) in each image. The following steps are presented in sequence:
Step 0: Pre-segment image I into regions R(I),
Step 1: Find matched points of interest P(I,J) that occur in images I and J, where I≠J,
Step 2: Tabulate the score of region R(I) in image I as the number of matched points of interest P(I,J) that are present in region R(I), and
Step 3: Merge into one region all sub-regions R(I) in image I that exceed a threshold score.
Alternately, Step 3 may be implemented as:
Alternate Step 3: Merge into one region all sub-regions R(I) in image I whose score together with those of nearest neighbors exceed a threshold score.

```
(Step 0)
For each image I
   R (I) = pre-segment (I)
(Step 1)
For each image I
   For each image J (where J is not I)
      Find matching local features from image I and image J.
      Denote all the matched point pair as P_1(I,J), P_2(I,J), P_3(I,J), etc.
(Step 2)
For each image I
   For each region R(I)
      For each image J (where J is not I)
         For each matching point P between image I and image J,
            If (P(I,J) is in region R(I))
               Increase Score(R(I))
(Step 3)
For each image I
   FinalRegion(I) = empty;
   For each region R(I)
      If (Score(R(I)) > threshold)
         Add region R(I) to FinalRegion(I).
(Alternate Step 3)
For each image I
   FinalRegion(I) = empty;
   For each region R(I)
      new_score(R(I)) = 0;
      For each neighboring region to R(I), denoted it as N_R(I)
         new_score(R(I)) = new_score(R(I)) + Score(N_R(I));
         if (new_score(R(I)) > threshold)
            Add region R(I) to FinalRegion(I)
```

A Markov model such as Markov Random Fields (MRF) may be used to determine that an unmatched region should be clustered together with the adjacent sub-clusters to form one coherent object. Alternately, a sufficient color similarity between the matched sub-regions and the unknown region may be used to infer that the regions are likely continuous and merge 1030 them together.

In a like fashion other coherent objects are identified in the images comprising the image collection yielding segmented images 470.

Example 1

The process of clustering sub-regions into coherent objects may be examined further with the images of the Sydney Opera House depicted in FIG. 11, as an example. FIG. 11A, FIG. 11B, and FIG. 11C depict a collection on images on the Sydney Opera House. Using color to do the pre-segmentation initially identifies coherent objects such as sections of the sky, the water, clouds, and various parts of the opera house, as illustrated in FIG. 11D and FIG. 11E for different images. The opera house may be identified as in FIG. 11F, for example, by merging five sub-regions of the opera house namely the two pillars and the three sections of the opera house, after determining that the sub-regions have one continuous boundary. Alternately, a continuous boundary determination might not be made leading to a gap or a discontinuity in between. If the center section of the opera house did not match between the images with similar objects, then this yields two sub-clusters with a gap in the middle representing the unmatched center section of the opera house. A Markov model or color similarity may be used to determine that the unmatched center region should be clustered together with the adjacent sub-clusters to form one coherent object that is the Sydney Opera House. FIG. 11F depicts the final segmented image showing the Sydney Opera House as a coherent object.

CONCLUSION

The present invention may be implemented in several ways. Pre-segmentation may be done with color, texture, geometric modeling, curvature, and even human labeling. For example, humans can also provide labels to objects of interest. An online image labeling game may be used, where a region of an image is labeled by a player, e.g., an image of a cow labeled as "cow". Such user-contributed labels may be propagated to other matching images and/or objects. Alternate embodiments include integration of geometric verification and feature generation such that the global positions of the features are incorporated into the feature values. For example, instead of representing each point of interest as a feature, two points of interest together with their intervening distance, say in pixels, may be represented as a feature. In the matching stage, the best match between two pairs of features together with their intervening distance may then be determined. The sub-regions may be merged in alternate ways including finding the largest bounding box over the matched points of interest or construction a graph using the sub-regions as nodes and their geometric distance as edges. Using a semi-supervised or transducive machine learning algorithm the labels may be propagated by examining the number of matched points along the graph.

The present invention may be used in several different ways. A few exemplary usage models are discussed below. Segmentation of images to identify common regions or objects may be used to generate hyperlinks to other images with similar regions or objects. For example, an image could store references to links to other similar images. Such virtual links to other images may be presented dynamically since images are constantly added to or removed from an image database, which necessitates that the virtual links be refreshed periodically. Virtual linking could be achieved by indexing an object in an image, assigning a unique identifier to the object, indexing all images containing a similar object to the unique identifier, and using the unique identifier as a query value. For example, an existing image could have the Sydney Opera House object segmented out. Upon receiving a new image, if the segmenting and matching identifies the same object, i.e., the Sydney Opera House, in the new image then a virtual link could be established that couples the existing image and the new image.

Other applications include identification of product placements in images, Zeitgeist, and hyperlinks within personal image collections. Hyperlinks within personal image collections may help locate other images with similar objects either from within the personal collection or from an online image repository, such as Google Images. For example, a user may click on an image containing the Eiffel Tower and retrieve other images containing the Eiffel Tower either from within the personal collection or from the online image repository. One possible application is to identify common objects in videos. Persistent objects in videos may be identified and similar objects in other videos may be found on demand.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

We claim:

1. A computer-implemented method for segmenting images from a plurality of images, the method comprising:
    analyzing the plurality of images to derive a fingerprint of each image, wherein each image has associated with it a plurality of patches containing points of interest associated with distinctive features in the image, and the fingerprint of the image comprises an aggregation of sub-fingerprints, each sub-fingerprint derived from one of the patches of the image;
    determining a set of at least two similar images in the plurality of images by identifying patches associated with a first image that match patches associated with a second image;
    determining a group of at least two similar images having at least one common object by performing geometric matching between the matching patches between pairs of similar images in the set, the geometric match of matching patches between a first image of a pair and a second image of the pair identifying at least one common object between the first image and the second image; and segmenting each image in the group of similar images having at least one common object, wherein segmenting comprises:

tabulating scores for a plurality of sub-regions within each image in the group of similar images based upon the number of points of interest within a sub-region matching points of interest in other images in the group of similar images;

determining two or more sub-regions within each image for merging based in part to their scores; and merging the determined sub-regions within each image to form the common object therein.

2. The method of claim 1, wherein analyzing the plurality of images to derive a fingerprint of each image comprises:

detecting a plurality of features at locations in the image, each feature detected based on a plurality of attributes associated with a location;

generating patches for the plurality of features, each patch comprising an area of the image having a fixed geometrical shape containing a feature;

generating a patch feature vector for each of the plurality of patches; and merging the plurality of patch feature vectors to derive the fingerprint of the image.

3. The method of claim 1, wherein segmenting further comprises:

combining information internal to an image in the group of similar images with information across the group of similar images to determine sub-regions within said image for merging.

4. The method of claim 1, wherein segmenting further comprises:

gaining information on individual similar images;

comparing the information across the group of similar images;

refining the information based on the comparison; and using the refined information to segment individual similar images.

5. The method of claim 2, wherein detecting a plurality of features in the image further comprises:

identifying a plurality of points of interest within each of the plurality of features;

selecting salient features from the plurality of features; and storing the salient features, each salient feature at a selected location containing at least one point of interest.

6. The method of claim 2, wherein detecting a plurality of features at locations in the image comprises:

detecting discontinuities, each discontinuity comprising a variation of the feature from the surrounding features.

7. The method of claim 2, wherein the plurality of attributes associated with a location comprises at least one of:

intensity, color, orientation, edge, texture, corner, or wavelet transform.

8. The method of claim 2, wherein the fixed geometrical shape is a circle.

9. The method of claim 2, wherein generating patches for the plurality of features comprises:

determining an optimal scale for each patch; and centering a patch on each detected feature.

10. The method of claim 2, wherein generating a patch feature vector for each of the plurality of patches comprises:

gridding a patch into a plurality of blocks, each block containing a plurality of bins;

computing a histogram for each attribute for each of the plurality of blocks;

deriving a block feature vector from each of the plurality of histograms for each of the plurality of attributes; and merging the plurality of block feature vectors to derive a patch feature vector.

11. The method of claim 10, wherein gridding the patch into a plurality of blocks comprises:

maintaining an invariant number of blocks in each patch irrespective of the scale of the patch.

12. The method of claim 10, wherein gridding the patch into a plurality of blocks comprises:

varying the number of blocks in each patch in relation to an attribute of the patch.

13. The method of claim 10, wherein gridding the patch into a plurality of blocks comprises:

varying the number of blocks in each patch based on a determination of the number of blocks.

14. The method of claim 10, wherein computing a histogram comprises:

varying a number of bins per block based on a determination of the number of blocks.

15. The method of claim 1, wherein performing geometric matching between the matching patches between pairs of similar images in the set comprises:

computing an inter-patch distance metric between the matching patches based on the patch feature vectors for each pairwise selection of the images in the set; and selecting similar images, the similar images corresponding to the pairwise selection of the images in the set having the inter-patch distance metric below a threshold.

16. The method of claim 15, wherein the distance metric between patches is a Euclidean distance computed from the patch feature vectors associated with each patch.

17. The method of claim 15, wherein performing geometric matching between the matching patches between the first image of the pair and the second image of the pair further comprises:

retrieving a collection of the matching patches corresponding to the first image of the pair;

retrieving a collection of the matching patches corresponding to the second image of the pair;

calculating a global transformation parameter between the collection of matching patches corresponding to the first image and the collection of matching patches corresponding to the second image; and verifying a geometric match between the matching collections of patches between the first image and the second image responsive to the global transformation parameter.

18. The method of claim 17, wherein the global transformation parameter comprises:

applying the transformation model:

$$Ax=B$$

between the collection of matching patches corresponding to the first image and the collection of matching patches corresponding to the second image where, A=positions of matching patches in the first image;

B=positions of matching patches in the second image; and x=global transformation parameter calculated using a least squares fit.

19. The method of claim 17, wherein verifying a geometric match between the matching collections of patches further comprises:

rejecting the match if a least squares fit error associated with the calculation of the global transformation parameter exceeds a threshold.

20. The method of claim 1, wherein segmenting further comprises:
determining color boundaries around the geometrically matched patches using a color model;
grouping the color boundaries into sub-regions;
clustering the sub-regions into a coherent region; and
merging the sub-regions using color similarity into a larger common region.

21. The method of claim 1, wherein segmenting further comprises:
for each of the plurality of similar images having the common object, storing virtual links to each of the other images in the plurality of similar images.

22. A computer program product having a non-transitory computer-readable medium having computer program instructions embodied therein for segmenting images from a plurality of images, the computer program product comprising computer program instructions for:
analyzing the plurality of images to derive a fingerprint of each image, wherein each image has associated with it a plurality of patches containing points of interest associated with distinctive features in the image, and the fingerprint of the image comprises an aggregation of sub-fingerprints, each sub-fingerprint derived from one of the patches of the image;
determining a set of at least two similar images in the plurality of images by identifying patches associated with a first image that match patches associated with a second image;
determining a group of at least two similar images having at least one common object by performing geometric matching between the matching patches between pairs of similar images in the set, the geometric match of matching patches between a first image of a pair and a second image of the pair identifying at least one common object between the first image and the second image; and
segmenting each image in the group of similar images having at least one common object, wherein segmenting comprises:
tabulating scores for a plurality of sub-regions within each image in the group of similar images based upon the number of points of interest within a sub-region matching points of interest in other images in the group of similar images;
determining two or more sub-regions within each image for merging based in part to their scores; and
merging the determined sub-regions within each image to form the common object therein.

23. The computer program product of claim 22, wherein segmenting further comprises:
gaining information on individual similar images;
comparing the information across the group of similar images;
refining the information based on the comparison; and
using the refined information to segment individual similar images.

24. An image segmentation server system for segmenting images from a plurality of images, the system comprising:
a feature detection module for detecting each of a plurality of features at locations in the plurality of images, each feature detected based on a plurality of attributes associated with a location;
a patch generation module for generating patches for the plurality of features, each patch comprising an area of a fixed geometrical shape containing a feature and centered around a point of interest associated with the feature;
an image fingerprint generation module for deriving a fingerprint for each of the plurality of images by merging a plurality of patch feature vectors for an image, each patch feature vector generated from each of the plurality of patches in the image;
a similar image identification module for identifying a set of at least two similar images in the plurality of images by identifying patches associated with a first image that match patches associated with a second image;
a geometric matching module for extracting matching patches between the images in the set for each of a plurality of pairwise selections of the images to identify a group of at least two similar images having at least one common object by performing geometric matching between the matching patches between pairs of similar images in the set, the geometric match of matching patches between a first image of a first pairwise selection and a second image of the first pairwise selection identifying at least one common object between the first image and the second image; and
a common object generation module for segmenting each image in the group of similar images having at least one common object, wherein segmentation comprises:
tabulating scores for a plurality of sub-regions within each image in the group of similar images based upon the number of points of interest within a sub-region matching points of interest in other images in the group of similar images;
determining two or more sub-regions within each image for merging based in part to their scores; and
merging the determined sub-regions within each image to form the common object therein.

25. The system of claim 24, wherein the common object generation module is further configured for:
using a color model to determine color boundaries around the geometrically matched patches;
grouping the color boundaries into sub-regions;
clustering the sub-regions into a coherent region; and
merging the sub-regions using color similarity into a larger common region.

* * * * *